June 30, 1925.
R. P. LIER
AUTOMOBILE BUMPER AND BRACE
Filed Sept. 23, 1924
1,544,163
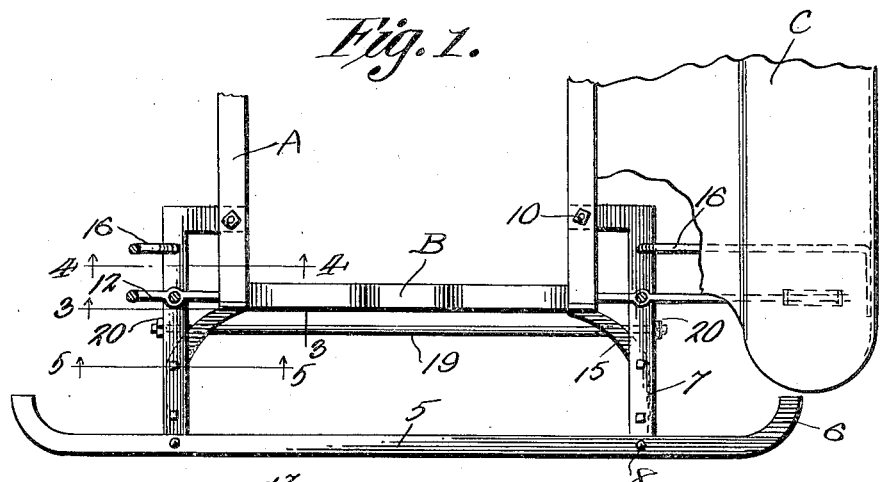
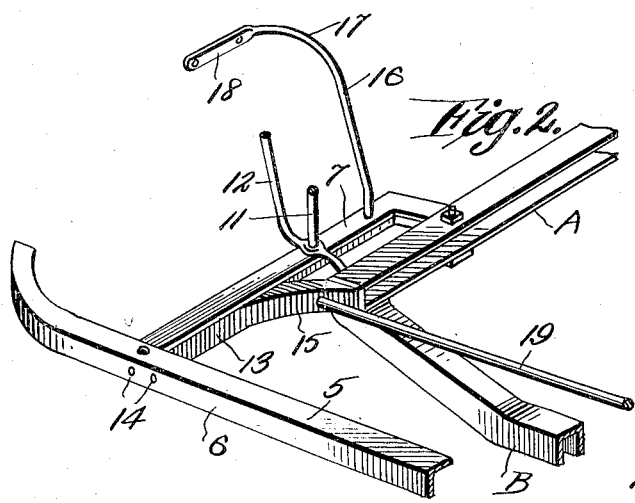
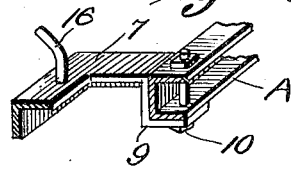
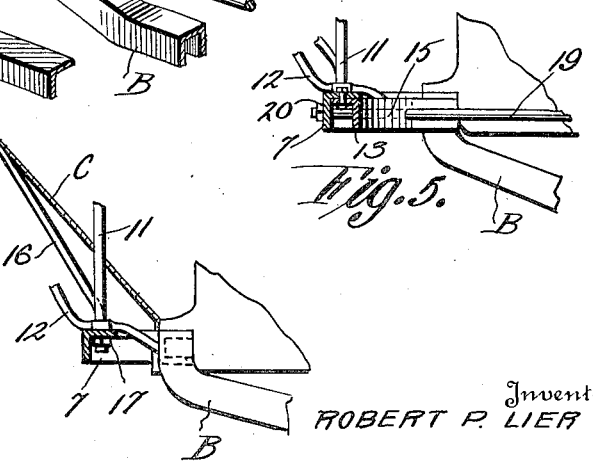
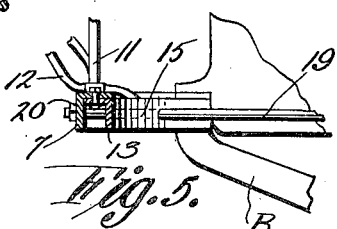
WITNESSES
Inventor
ROBERT P. LIER
By Richard B. Owen, Attorney Patented June 30, 1925.

1,544,163

UNITED STATES PATENT OFFICE.

ROBERT P. LIER, OF MITCHELL, SOUTH DAKOTA.

AUTOMOBILE BUMPER AND BRACE.

Application filed September 23, 1924. Serial No. 739,416.

*To all whom it may concern:*

Be it known that I, ROBERT P. LIER, a citizen of the United States, residing at Mitchell, in the county of Davison and State of South Dakota, have invented certain new and useful Improvements in Automobile Bumpers and Braces, of which the following is a specification.

The present invention appertains to a bumper and brace for automobiles and has for an important object thereof the provision of a device wherein the shock imparted to the bumper will be transferred to the front end of the chassis so as to eliminate any danger of shearing bolts or other fastening elements and at the same time the provision of a device which will efficiently brace the front end of the frame and fenders of the automobile.

Another important object of the invention is to provide a device of this character which is so constructed that it is readily applicable to an automobile without in any manner altering the present construction thereof.

A still further object of the invention is to provide a device of this character which possesses a very simple construction which is strong, durable inexpensive to manufacture, reliable, and well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a top plan view of the device embodying the features of my invention showing the same associated with parts of the forward end of an automobile, Figure 2 is a detail fragmentary perspective thereof, Figure 3 is a detail section taken on the line 3—3 of Figure 1 looking in the direction of the arrow, Figure 4 is a detail perspective view taken substantially on the line 4—4 of Figure 1 looking in the direction of the arrow, and Figure 5 is a detail section taken on the line 5—5 of Figure 1 looking in the direction of the arrows.

Referring to the drawing in detail it will be seen that A designates generally the chassis of an automobile and the present illustration shows that variety of chassis which is now commonly used on Ford cars which is provided at its forward end with the inverted arc B. C designates one fender which is mounted on the chassis in the usual manner.

A bumper bar 5 is preferably formed of angle iron having its ends 6 curved toward the automobile, L-shaped bracket bars 7 are fastened at their ends as at 8 to intermediate portions of the bumper bar 5 adjacent its ends 6. The other ends of these bracket bars 7 terminate in a flange formation 9 which extends underneath the chassis A and are fastened in place by bolts 10 or in any other suitable manner. These bracket bars 7 are suspended on lamp bracket bars 11 which are carried by the fender supports 12 fixed in the usual manner to the chassis A.

Struts 13 are preferably formed of angle iron as are the bumper bar 5 and bracket bars 7. These struts include straight portions which are disposed in the bracket bars 7 adjacent the bumper bar 5 and are riveted or otherwise fastened to this bumper bar as at 14. These struts also include curved portions 15 at their rear ends which terminate in abutment with the forward ends of the side rails of the chassis A and may be fixed thereto in any suitable manner. Thus it will be seen that any shock delivered to the bumper 5 will be transferred directly to the end of the chassis A through these struts 13 thereby eliminating the danger of shearing bolts or other fastening elements as is common in the majority of bumpers now in common use. Fender bracing arms 16 pass through and are mounted on the bracket bars 7 adjacent their rear ends being held in place by nuts 17 or in any other suitable manner and rise therefrom the upper portions thereof as at 17 being curved to conform with the under contour of the fender C. These arms terminate in flattened portions 18 which may be fastened to the flanges at the outer sides of the fender.

A brace bar 19 extends along the front end of the chassis and pierces the struts 13 through their curved portions 15 and the adjacent portions of the bracket bars 7. Nuts 20 are disposed on the ends of this brace bar 19 and are threaded to bear against the bars 7 thus efficiently bracing the inverted arc B for preventing the same from becoming broken or relieving strain therefrom should it be cracked or otherwise defective.

From the above description it will be readily seen when analyzing the peculiar formation of this device that when the same is subjected to a bump, said bump will be transmitted directly to the front end of the chassis through struts 13 in such a manner that no direct stress is transmitted through bolts or other fastening elements. The device is capable of being installed on Ford automobiles or the like in a few minutes and constitutes a very rigid bumper and support.

It will be apparent from the foregoing that I have devised a novel construction which will be cheaply manufactured and will be durable and effective under all conditions and which is not liable to readily get out of order.

It will also be apparent that I have devised a novel and useful construction of a combination bumper and brace which embodies the features of advantage enumerated as desirable in the statement of the invention and the foregoing description, and while I have in the present instance shown and described a preferred embodiment of it which will give in practice satisfactory and reliable results, it is to be understood that the same is susceptible of modification in various particulars without departing from the spirit or scope of the invention as hereinafter claimed or sacrificing any of its advantages.

Having thus described my invention, what I claim as new is:

1. A device of the class described including in combination a bumper, a pair of L-shaped bracket bars attached to intermediate portions of the bumper, an automobile chassis, means for attaching the other ends of the bars to the chassis, struts having their ends in abutment with the bumper and extending along the bars and then being curved inwardly to abut the end of the chassis.

2. A device of the class described including in combination a bumper, a pair of L-shaped bracket bars attached to intermediate portions of the bumper, an automobile chassis, means for attaching the other ends of the bars to the chassis, struts having their ends in abutment with the bumper and extending along the bars and then being curved inwardly to abut the end of the chassis, a brace bar extending along the front end of the chassis piercing the struts and the bracket bars, and the nuts on the ends of the brace bars.

3. A device of the class described including in combination a bumper, a pair of L-shaped bracket bars attached to intermediate portions of the bumper, an automobile chassis, means for attaching the other ends of the bars to the chassis, struts having their ends in abutment with the bumper and extending along the bars and then being curved inwardly to abut the end of the chassis, a brace bar extending along the front end of the chassis piercing the struts and the bracket bars, the nuts on the ends of the brace bars, lamp supports engaged to suspend the bracket bars intermediate their ends.

4. A device of the class described including in combination a bumper, a pair of L-shaped bracket bars including long arms and short arms, the ends of the long arms being fastened to intermediate portions of the bumper, an automobile chassis, the ends of the shorter arms being terminated in flanges, means for engaging the flanges with the chassis, and struts including straight portions lying alongside of the bars, and curved portions terminating in abutment with the end of the chassis whereby bumps imparted to the bumper will be transmitted by the struts to the end of the chassis.

5. A device of the class described including a bumper, means for mounting the bumper on the chassis of an automobile, a fender bracing arms rising from said means inwardly of the forward end of the chassis and terminating in flattened portions extending longitudinally of the chassis and adapted to be secured to the outer longitudinally extending side flanges of the automobile fenders.

6. A device of the class described including in combination an automobile chassis, fenders on the chassis, said chassis including side rails and at its forward end an inverted arc, a bumper, L-shaped bars including long portions and short portions, the ends of the long portions being fixed to the bumper, the ends of the short portions terminating in a flanged formation for receiving the side rails of the chassis, bolts engaging the flanged formation with the side rails, lamp supports suspending the intermediate portion of the long arms of the L-shaped bars, fender bracing members supported on the long arms of the bars adjacent the short arms terminating in portions curved to conform with the inner contour of the fenders and then flattened, means for fastening the flattened portions to the edges of the fender, a pair of struts including straight portions and curved portions, said straight portions being fixed to the long arms of the bars and in abutment with the bumper and the curved portions being terminated in abutment with the ends of the side rails of the chassis, and a brace bar extending along the front end of the chassis piercing the struts and the long arms of the L-shaped bars, nuts threaded on the ends of the brace bars to draw the L-shaped bars toward each other thereby bracing the arch of the chassis through the medium of the side rails thereof.

In testimony whereof I affix my signature in the presence of two witnesses.

ROBERT P. LIER.

Witnesses:
P. M. YOUNG,
R. A. TOWNSEND.